United States Patent
Tabone

(10) Patent No.: US 8,966,304 B1
(45) Date of Patent: Feb. 24, 2015

(54) PERIODIC SYSTEM WAKEUP TO UPDATE STATE

(75) Inventor: Ryan Tabone, San Francisco, CA (US)

(73) Assignee: Google Inc., Mountain View, CA (US)

(*) Notice: Subject to any disclaimer, the term of this patent is extended or adjusted under 35 U.S.C. 154(b) by 507 days.

(21) Appl. No.: 13/079,531

(22) Filed: Apr. 4, 2011

(51) Int. Cl.
*G06F 1/26* (2006.01)

(52) U.S. Cl.
USPC ......................................................... 713/323

(58) Field of Classification Search
USPC ......................................................... 713/323
See application file for complete search history.

(56) References Cited

U.S. PATENT DOCUMENTS

| | | | |
|---|---|---|---|
| 6,285,601 B1 | 9/2001 | Smith | |
| 6,308,061 B1 * | 10/2001 | Criss et al. | 455/418 |
| 7,539,762 B2 * | 5/2009 | Achtermann et al. | 709/228 |
| 7,606,156 B2 | 10/2009 | Delangis | |
| 7,711,794 B2 | 5/2010 | Russell | |
| 7,793,122 B1 * | 9/2010 | Manuilov | 713/300 |
| 7,814,195 B2 | 10/2010 | Dacosta | |
| 7,836,321 B2 | 11/2010 | Aaltonen et al. | |
| 7,890,779 B2 | 2/2011 | Kim | |
| 7,908,561 B2 * | 3/2011 | Shin et al. | 715/763 |
| 7,913,100 B2 * | 3/2011 | Songer et al. | 713/323 |
| 7,979,516 B2 | 7/2011 | Dacosta | |
| 8,073,485 B2 | 12/2011 | Yamasaki et al. | |
| 8,175,584 B2 * | 5/2012 | Estevez et al. | 455/414.1 |
| 2003/0093520 A1 | 5/2003 | Beesley | |
| 2005/0076085 A1 | 4/2005 | Budd | |
| 2005/0243727 A1 | 11/2005 | Makela | |
| 2006/0069769 A1 * | 3/2006 | Dacosta | 709/224 |
| 2006/0129851 A1 | 6/2006 | Will et al. | |
| 2006/0277277 A1 | 12/2006 | Landschaft et al. | |
| 2007/0055660 A1 | 3/2007 | Anderson | |
| 2010/0153765 A1 * | 6/2010 | Stemen et al. | 713/340 |
| 2010/0235504 A1 | 9/2010 | Sengupta | |
| 2011/0075598 A1 | 3/2011 | Jalfon et al. | |
| 2011/0145808 A1 | 6/2011 | Mountain et al. | |
| 2011/0151922 A1 | 6/2011 | Venteicher | |
| 2011/0217960 A1 | 9/2011 | Tanaka et al. | |
| 2011/0289334 A1 | 11/2011 | Bold et al. | |
| 2011/0307561 A1 | 12/2011 | Gao et al. | |
| 2012/0005511 A1 | 1/2012 | Sengupta et al. | |

(Continued)

OTHER PUBLICATIONS

Non-Final Office Action Response for U.S. Appl. No. 13/246,751, filed Apr. 17, 2012, 15 pages.

(Continued)

*Primary Examiner* — Kim Huynh
*Assistant Examiner* — Eric Chang
(74) *Attorney, Agent, or Firm* — Brake Hughes Bellermann LLP

(57) ABSTRACT

Methods and apparatus for updating state of computing devices are disclosed. An example method includes automatically scheduling, in a computing device, an update-process trigger. In the example method, occurrence of the update-process trigger causes the computing device to transition from a low power state to a first active power state and perform an update process. The update-process trigger may be scheduled based on one or more heuristics association with a given computing device. The example method further includes initiating, after scheduling the update-process trigger, a transition of the computing device from a second active power state to the low power state. In response to occurrence of the update-process trigger, the example method includes initiating the transition of the computing device from the low power state to the first active power state and performing the update process after the transition from the low power state to the first active power state.

26 Claims, 10 Drawing Sheets

(56) References Cited

U.S. PATENT DOCUMENTS

2012/0151055 A1 6/2012 Kansal et al.
2012/0258673 A1 10/2012 Delangis

OTHER PUBLICATIONS

"Hibernation (computing)", Wikipedia, the free encyclopedia, Feb. 26, 2011, 4 pages.
"Sleep Mode", Wikipedia, the free encyclopedia, Feb. 22, 2011, 2 pages.
Non-Final Office Action for U.S. Appl. No. 13/246,751, mailed Jan. 25, 2012, 20 pages.
Non-Final Office Action Response for U.S. Appl. No. 13/246,751, filed Mar. 18, 2013, 16 pages.
Final Office Action for U.S. Appl. No. 13/246,751, mailed Jun. 21, 2012, 17 pages.
Non-Final Office Action for U.S. Appl. No. 13/246,751, mailed Dec. 18, 2012, 16 pages.
Final Office Action Response for U.S. Appl. No. 13/246,751, filed Sep. 23, 2013, 14 pages.
Final Office Action Response for U.S. Appl. No. 13/246,751, filed Sep. 19, 2012, 15 pages.
Final Office Action for U.S. Appl. No. 13/246,751, mailed Jul. 2, 2013, 8 pages.
Notice of Allowance for U.S. Appl. No. 13/246,751, mailed Sep. 30, 2013, 6 pages.

\* cited by examiner

| TYPE | NUMBER | SIZE |
|---|---|---|
| E-MAIL | 10 | 1.6MB |
| IM | 30 | 16KB |
| VOICEMAIL | 5 | 2.7MB |

FIG.5A

| TYPE | NUMBER | HIGHEST PRIORITY | SIZE |
|---|---|---|---|
| SECURITY | 2 | 1 | 3.4MB |
| OPERATING SYSTEM | 1 | 4 | 5.6MB |
| CLIENT SOFTWARE | 3 | 2 | 18.7MB |

FIG.5B

PERIODIC SYSTEM WAKEUP TO UPDATE STATE

TECHNICAL FIELD

This document relates, generally, to updating a state of a computing system using periodic wakeups.

BACKGROUND

Mobile computing devices, such as laptop computers, tablet computers, netbook computers, or other such devices, often implement a number of power management techniques in order to reduce the amount of power consumed by those devices, so as to prolong battery life between charges. In some approaches, such techniques may be used only when the device is operating on battery power, or, in other approaches, may be used regardless of the power source being used (e.g., battery or AC power). Common power management techniques include performing a screen dimming operation for a display panel of a computing device, turning off the screen and/or performing a system suspend operation, where current operating information for a computing device is saved to random access memory (RAM) or to disk (e.g., a hard drive or flash drive) and the computing device is then placed in a very low power operating state.

Such power management techniques may be performed by a computing device when the computing device detects that it has not received any user input (e.g., keyboard or pointing device input) in a specific period of time and has not been explicitly instructed by an interface of an application running on the system to not perform power management activities. For example, a computing device may first dim a computing device's screen after a period of time, and then, sometime later, turn off the screen, and then, sometime even later, perform a system suspend operation, such as those described above, and remain in the suspend state until the user interacts with the computing device by, for example, opening a display, entering a keystroke, using the pointing device or engaging a power switch, as some examples.

When a computing device is suspended to RAM or disk, the operating state of the device remains static. For example, the computing device, when suspended, does not request or receive updated information for applications running on the computing device at the time it was suspended, such as emails, instant messages or voicemails, for example. The computing device also does not install any operating system and/or security related updates when it is suspended. When a user interacts with the suspended computing device, the computing device will resume normal operation and then request and receive information used to update the operating state of the computing device, such as, for example, emails, instant messages and voicemails sent to the user since the computing device entered the suspend state, pending operating system and security related updates, among a number of other items. Such an approach may detract from the user's experience, however, as the user has to wait for such updates to complete after interacting with the system before the computing system's operating state is current. Furthermore, the resources of the computing system may be heavily utilized during such updates, thus impacting performance of the computing system during the updates.

SUMMARY

In a general aspect, a computer-implemented method includes automatically scheduling, in a computing device, an update-process trigger, where occurrence of the update-process trigger causes the computing device to: transition from a low power state to a first active power state; and perform an update process for the computing device. The computer-implemented method includes initiating, after scheduling the update-process trigger, a transition of the computing device from a second active power state to the low power state; and, in response to occurrence of the update-process trigger: initiating the transition of the computing device from the low power state to the first active power state; and performing the update process after the transition from the low power state to the first active power state is complete.

Implementations may include one or more of the following features. For example, scheduling the update-process trigger may include scheduling a real-time-clock alarm where occurrence of the alarm indicates occurrence of the update-process trigger. Scheduling the update-process trigger may include initializing a timer, where the timer is configured such that expiration of the timer indicates occurrence of the update-process trigger.

The low power state may include one of a suspend-to-RAM power state, a suspend-to-disk power state and a powered-off power state. The first active power state may be a display-off active power state and the second active power state may be a display-on active power state. The first active power state and the second active power state may be substantially equivalent active power states.

Scheduling the update-process trigger may include scheduling the update-process trigger based on at least one of a history of user interaction with the computing device and an application update frequency for the computing device. Scheduling the update-process trigger may include scheduling the update-process trigger based on at least one of an amount of time elapsed since a last security update of the computing device and an amount of time elapsed since a last operating system update of the computing device. Scheduling the update-process trigger may include scheduling the update-process trigger based on at least one of a calendar date of the computing device and a time of day of the computing device.

The update process may include at least one of updating respective states of one or more user applications of the computing device, updating respective states of one or more security components of the computing device, and updating an operating system of the computing device. The update process may include sending, from the computing device to a server, an update request; receiving, from the server, a response to the update request, the response indicating a quantity of available update information data for the computing device, and, if the quantity of available update information data exceeds a threshold amount: requesting the available update information from the server, receiving the available update information from the server and updating an operating state of the computing device using the received update information.

The received update information may include at least one of respective update information for one or more user applications of the computing device, respective update information for one or more security components of the computing device and update information for an operating system of the computing device. The respective update information for the one or more user applications of the computing device may include at least one of: one or more email messages, one or more voicemail messages and one or more instant messages. The respective update information for the one or more security components of the computing device may include at least one of virus definition updates and spyware signature updates. If the quantity of available update information data is below the threshold amount, the update process may further include automatically scheduling another update-process trigger and transitioning the computing device from the first active power state to the low power state.

The update process may include sending, from the computing device to a server, an update request; receiving, from the server, a response to the update request. The response may indicate at least one of a priority of an available operating system update for the computing device and a priority of an available security component update for the computing device. If at least one of the received priorities is at or above a respective threshold priority level, the update process may include requesting available update information from the server, receiving the available update information from the server, and updating at least one of an operating system of the computing device and a security component of the computing device using the received update information.

The update process may include sending, from the computing device to a plurality of servers, respective update requests; receiving, from the plurality of servers, respective responses to the update requests, each response indicating a respective quantity of available update information data for the computing device; and determining a total quantity of available update information data based on the respective quantities of available update information data. If the total quantity of available update information data is equal to or above a threshold amount, the update process may include: requesting the available update information from the plurality of servers; receiving the available update information from the plurality of servers; and updating an operating state of the computing device using the received update information.

Scheduling the update-process trigger may include traversing, by the computing device, a decision tree, where the computing device traverses the decision tree based on at least one of a history of user interaction with the computing device, an application update frequency for the computing device, a time of a last security update of the computing device, a time of a last operating system update of the computing device, a calendar data of the computing device and a time of day of the computing device.

The update process may include sending an update request; receiving a response to the update request, the response including at least one of: an indication of available user application update information for the computing device; an indication of available security component update information for the computing device; and an indication of available operating system update information for the computing device. The update process may include: traversing, by the computing device based on the indications included in the response, a decision tree; and, based on the traversing, determining: whether to update a respective state of one or more applications of the computing device; whether to update a respective state of one or more security components of the computing device; and whether to update an operating system of the computing device.

In another general aspect, a recordable storage medium has recorded and stored thereon instructions that, when executed, cause a computing device to automatically schedule, in a computing device, an update-process trigger, where occurrence of the update-process trigger causes the computing device to: transition from a low power state to a first active power state and perform an update process for the computing device. The instructions, when executed, also cause the computing device to initiate, after scheduling the update-process trigger, a transition of the computing device from a second active power state to the low power state; and, in response to occurrence of the update-process trigger: initiate the transition of the computing device from the low power state to the first active power state; and perform the update process after the transition from the low power state to the first active power state is complete.

Implementations may include one or more of the following features. For example, the instructions for implementing the update process, when executed, may cause the computing device to perform at least one of: updating respective states of one or more user applications of the computing device; updating respective states of one or more security components of the computing device; and updating an operating system of the computing device.

The instructions for implementing the update process, when executed, may cause the computing device to send, from the computing device to a server, an update request; receive, from the server, a response to the update request, the response including an indication of available update information for the computing device; and if the indication of available update information satisfies one or more threshold criteria: request at least a portion of the available update information from the server; receive the requested available update information from the server; and update an operating state of the computing device using the received update information.

The instructions for implementing the update process, when executed, may cause the computing device to send an update request; receive a response to the update request, the response including at least one of: an indication of available user application update information for the computing device; an indication of available security component update information for the computing device; and an indication of available operating system update information for the computing device. The instructions for implementing the update process, when executed, may further cause the computing device to traverse, based on the indications included in the response, a decision tree; and, based on the traversing, determine: whether to update a respective state of one or more applications of the computing device; whether to update a respective state of one or more security components of the computing device; and whether to update an operating system of the computing device.

In another general aspect, an apparatus includes a processor and a non-transitory recordable storage medium having instructions recorded thereon, where the apparatus is configured, as result of executing the instructions, to automatically schedule, in a computing device, an update-process trigger, where occurrence of the update-process trigger causes the computing device to: transition from a low power state to a first active power state and perform an update process for the computing device. The apparatus is further configured, as result of executing the instructions, to initiate, after scheduling the update-process trigger, a transition of the computing device from a second active power state to the low power state; and in response to occurrence of the update-process trigger: initiate the transition of the computing device from the low power state to the first active power state and perform the update process after the transition from the low power state to the first active power state is complete.

Implementations may include one or more of the following features. For example, the apparatus may include a real-time clock, where scheduling the update-process trigger comprises scheduling an alarm in the real-time clock. The real-time clock may be configured such that occurrence of the alarm indicates occurrence of the update-process trigger. The apparatus may include a timer, where scheduling the update-process trigger comprises initializing the timer. The timer may be configured such that the timer remains active when the computing device is in the low power state and expiration of the timer indicates occurrence of the update-process trigger.

The apparatus may include an activity monitor configured to maintain a history of user interaction with the computing device and monitor respective update frequencies for one or more applications of the computing device, where the update-process trigger is scheduled based on at least one of the history of user interaction and the respective update frequencies.

BRIEF DESCRIPTION OF THE DRAWINGS

FIGS. 5A and 5B are tables illustrating information regarding available update information for a computing device in accordance with example embodiments.

DETAILED DESCRIPTION

Figure 1:
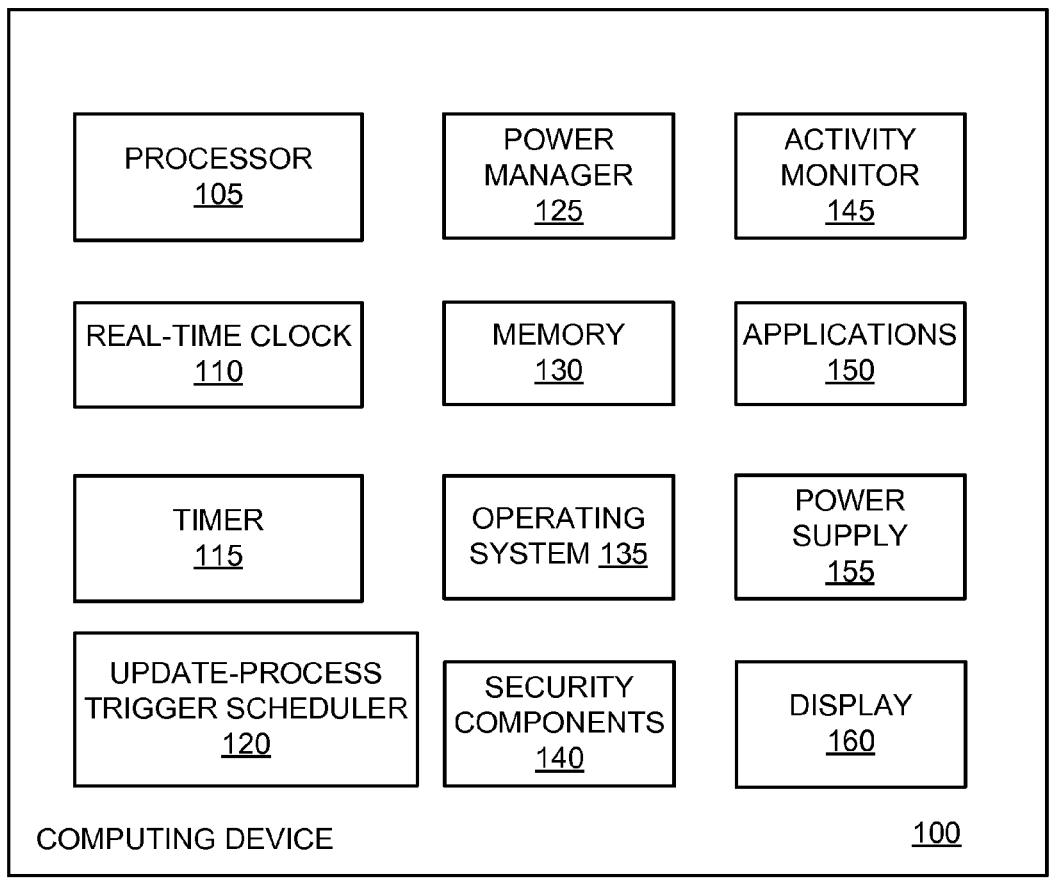
FIG. 1 is a block diagram illustrating a computing device in accordance with an example embodiment

FIG. 1 is a block diagram of a computing device 100 in accordance with an example embodiment. The computing device 100, as illustrated in FIG. 1, includes a number of modules, components and/or devices. It will be appreciated that the specific elements illustrated in FIG. 1 are shown for illustrative purposes and by way of example. In other embodiments, a computing device may include fewer elements, additional elements or may substitute certain elements with other elements. Also, the various elements of the computing device 100 may be operationally coupled with one another in a number of appropriate manners. For instance, a processor 105 of the computing device 100 may be operationally coupled with one or more of the other elements of the computing device 100 using a bus, or multiple busses.

As shown in FIG. 1, the computing device 100 includes the processor 105, a real-time clock (RTC) 110, a timer 115, an update-process trigger scheduler module 120, a power manager 125, memory 130, an operating system 135, security components 140, an activity monitor module 145, user applications 150, a power supply 155, and a display 160. In some embodiments, two or more of these elements may be combined into a single element. For example, the power manager 125 may be implemented as part of the operating system 135. In other embodiments, a single element of the computing device 100 may be implemented as multiple elements, or may include multiple sub-elements. For instance, the memory 130 may be implemented as separate volatile (e.g., random-access memory) and non-volatile memory (e.g., a hard disk drive and/or a flash memory drive) elements, or as sub-elements of the memory 130. As another example, the applications 150 could be stored in the memory 130. In other embodiments, the applications 150 could be placed in, and/or may use the memory 130, when they are being executed in the computing device 100. It will be appreciated that the particular arrangement of elements of a computing device will depend, at least in part, on the specific embodiment.

The computing device 100 may be configured to operate and/or implement a number of different power states. Such power states may include one or more active power states, a suspend-to-RAM power state, a suspend-to-disk power state and/or a powered-off power state, such as those described above.

The active power states in the computing device 100 may include a display-on active state and a display-off active state. In the display-on active state, the display 160 of the computing device 100 is active (powered on) and may be used to render visual content generated by the computing device 100. Such visual content may include user application interfaces, video content being played by the computing device 100, among a number of other types of visual content.

In the display-off active state, the display 160 is powered off. In the display-off active state, the components of the computing device 100 other than the display 160 may operate with substantially equivalent levels of functionality as the in the display-on active state. Because computing device displays, such as the display 160, may consume a substantial amount of power when active, operating the computing device 100 in the display-off power state (e.g., when performing an update process) may consume significantly less power than operating in the display-on active state.

In some embodiments, the computing device 100 may operate, at least a portion of the time, in the display-off active state when performing an update process, such as using the techniques described herein. In other embodiments, the computing device 100 may operate in the same active power state (e.g., display-on) regardless of whether or not an update process is being performed. In other situations, the computing device 100 may operate in a display-off state (as part of power management of the computing device 100) prior to being suspended and also operate in a display-off state during an update process (i.e., in response to occurrence of an update-process trigger, as described herein). Depending on the embodiment, either of the active power states described above may be implemented when the computing device 100 is operating on battery power or wall (AC) power (e.g., using an AC-to-DC power converter), such as may be included in the power supply 155.

The suspend-to-RAM power state of the computing device 100 may be referred to as "Standby," "Sleep," or "Suspend," depending on the particular embodiment In such a low power state, aside from powering the random access memory ("RAM") that is required to restore the computing device's 100 operating state, the computing device 100 attempts to reduce or cut power to all unneeded parts of the machine (e.g., the hard disk(s) stop spinning, the display device is placed into a dark or low power state, and peripheral devices are de-powered). Such a low power state often is called Standby (for computing devices running a Microsoft Windows 95—Server 2003 operating system), or is called Sleep (for computing devices running an Apple operating system or a Windows Vista, Windows 7, Windows Server 2008 operating system), or Suspend (for computing devices running a Linux operating system). In such a state, the processing functions of the computing device 100 are powered down, and some small amount of power is used to preserve the contents of RAM and support waking up the computing device from the low power state into an active power state. When the computing device 100 is placed into the Standby, Sleep, or Suspend to RAM state, it typically consumes less than about 20% of the total power than is consumed when the computing device 100 is operating in an active power state.

The suspend-to-disk power state of the computing device 100 may be referred to as "Hibernate," or "Safe Sleep" or "suspend-to-disk," depending on the particular embodiment. In such a state the contents of the computing device 100's RAM are written to non-volatile storage such as a hard disk, as a file or on a separate partition, before powering off the computing device 100. When the computing device 100 is restarted or resumed from the suspend-to-disk state, it reloads the data that had been written to the non-volatile memory and is, thus, restored to the state it was in when the suspend-to-disk power state was invoked. To enable the suspend-to-disk power state, the hard disk must have sufficient free space to store all non-replaceable contents of RAM. Such a low power state often is called Hibernate (for computing devices running a Microsoft Windows 95—Server 2003, a Microsoft Vista operating system or a Windows 7 operating system), Safe Sleep (for computing devices running an Apple operating system), or suspend-to-disk (for computing devices running a Linux operating system). When the computing device 100 is placed into the suspend-to-disk power state, it typically consumes about as much power as is consumed when the computing device 100 is powered off.

The suspend-to-disk power state of the computing device 100 may be referred to as "Hibernate," or "Safe Sleep" or "suspend-to-disk," depending on the particular embodiment. In such a state the contents of the computing device's 100 RAM are written to non-volatile storage such as a hard disk, as a file or on a separate partition, before powering off the computing device 100. When the computing device 100 is restarted or resumed from the suspend-to-disk state, it reloads the data that had been written to the non-volatile memory and is, thus, restored to the state it was in when the suspend-to-disk power state was invoked. To enable the suspend-to-disk power state, the hard disk must have sufficient free space to store all non-replaceable contents of RAM. Such a low power state often is called Hibernate (for computing devices running a Microsoft Windows 95—Server 2003, a Microsoft Vista operating system or a Windows 7 operating system), Safe Sleep (for computing devices running an Apple operating system), or suspend-to-disk (for computing devices running a Linux operating system). When the computing device 100 is placed into the suspend-to-disk power state, it typically consumes about as much power as is consumed when the computing device 100 is powered off.

In the computing device 100, the power manager 125 may be configured to manage the process of transitioning the computing device 100 from one power state to another. For example, the power manager 125 may signal one or more elements of the computing device 100 to indicate a desired change in power state (e.g., as instructed by other elements of the computing device 100) to initiate a transition between power states. The power manager 125 may be further configured to monitor the various elements of the computing device 100 to ensure that they complete any operations or functions associated with a transition between power states of the computing device 100. For example, if the computing device 100 is transitioning from an active power state to a suspend state or to off state, the power manager 125 may monitor the various elements of the computing device 100 to ensure that any housekeeping operations (e.g., saving operating state information (e.g., for use when returning the computing device 100 to an active power state)) are completed before allowing the computing device 100 to enter the suspend state or the off state.

In an example embodiment, an update process may be implemented in the computing device 100, such as using the techniques described herein. In one embodiment, the update-process trigger scheduler (scheduler) 120 may automatically schedule an update-process trigger in the computing device 100 without intervention of a user, such as using the techniques described herein. In such an approach, occurrence of the update-process trigger may cause the computing device 100 to transition from a suspended or off power state to an active power state (e.g., either a display-off active state or a display-on active state) and to perform an update process. In one embodiment, the scheduler 120 may schedule an update-process trigger by setting an alarm in the RTC 110. In another embodiment, the scheduler 120 may schedule an update-process trigger by initializing the timer 115. Of course, other techniques for automatically scheduling an update-process trigger are possible.

In an example embodiment, the scheduler 120 may automatically schedule an update-process trigger using one or more decision trees, where the decision trees are traversed based on heuristics of the computing device 100. Examples of such approaches are discussed in further detail below, such as with respect to FIGS. 2 and 9, for example. In one embodiment, heuristics or operating statistics of the computing device may be gathered by the activity monitor 145. An example of such an activity monitor is described in further detail below with respect to FIG. 2.

An update process, such as described herein, may be implemented to, in response to occurrence of the update-process trigger, perform updates to an operating state of the computing device 100. For example, an update process may be performed to update respective operating states of one or more user applications 150. For instance, the update process may be used to update an email application, an instant messaging application and/or a phone/voicemail application with information (e.g., emails, instant messages and voicemails) for a user that was received while the computing device 100 was in a suspended or off power state.

An update process may also be implemented to, in response to occurrence of an update-process trigger, update respective operating states of one or more security components 140 of the computing device 100. In an example embodiment, the security components 140 may include anti-virus protection, spyware removal software and/or a firewall, among other possible security components. The update process may be used to update anti-virus definitions, spyware signatures or install functional updates to the firewall, as some example. In other embodiments, an update process may perform other operations.

An update process may also be further implemented to, in response to occurrence of an update-process trigger, update an operating system 135 of the computing device 100. In an example embodiment, the update process may include requesting, receiving and installing updates to the operating system 135. An update process may be implemented in a number of manners, such as using the techniques described herein or other appropriate techniques. The foregoing discussion is given by way of general example.

Figure 2:
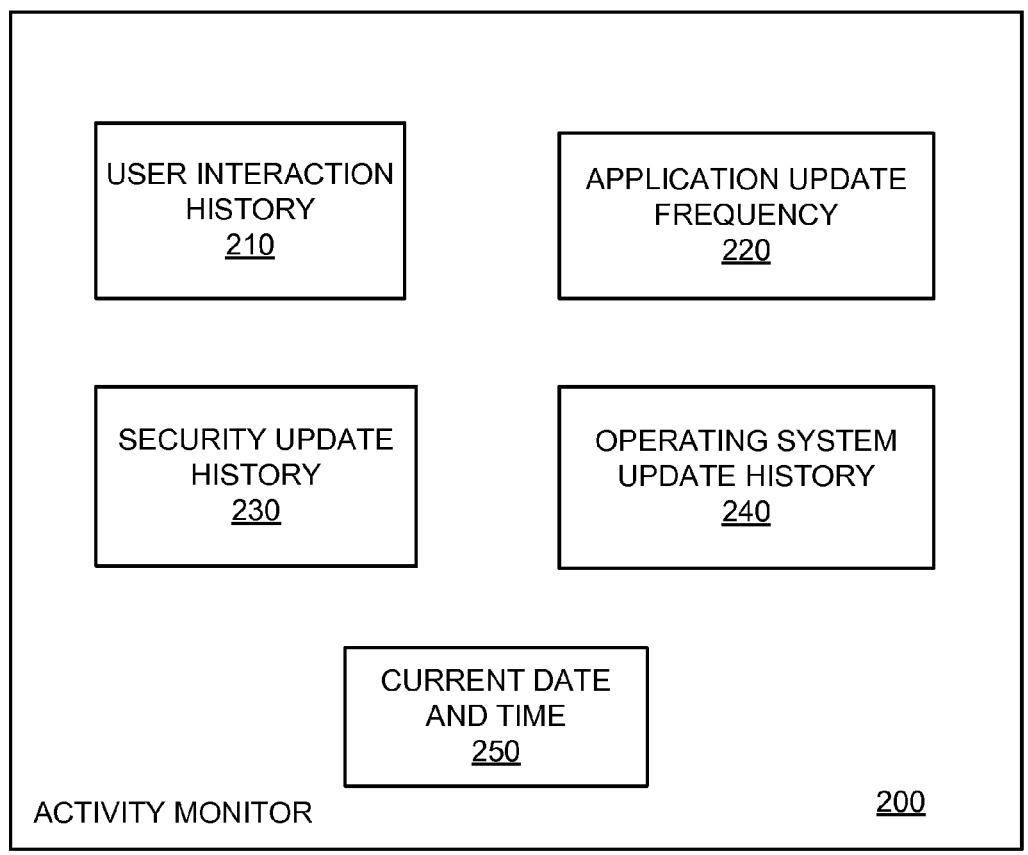
FIG. 2 is a block diagram illustrating an activity monitor in accordance with an example embodiment.

FIG. 2 is a block diagram illustrating an activity monitor 200 in accordance with an example embodiment. The activity monitor 200 may be implemented as the activity monitor 145 in the computing device illustrated in FIG. 1. As noted above, the activity monitor 200 may be used to gather and/or generate heuristics or operating statistics for a computing device, such as the computing device 100. These heuristics may then be used by a scheduler, such as the scheduler 120, to automatically schedule an update-process trigger (e.g., by setting an RTC alarm or initializing a timer). The activity monitor 200 includes a user interaction history module 210, an application update frequency 220 module, a security update history module 230 and an operating system update history module 240. The activity monitor 200 further includes a current date and time module 250, which the other modules of the activity monitor 200 may refer to when collecting information and generating heuristics.

In an example embodiment, each of the modules 210-240 may collect information and produce heuristics that may be used by the scheduler 120 to schedule update-process triggers. For example, the user interaction history module 210 may monitor patterns of user interaction with a computing device. Based on that monitoring, the activity monitor 200 may produce heuristics that represent the user interaction pattern. For example, the user interaction history module 210 may determine that if a user of the associated computing device does not interact with the computer within one hour after a last interaction, it is likely that the user will not interact with the computing device again until the following business day. This aspect of the user interaction pattern may then be represented in the heuristics. Other aspects of the user interaction pattern, such as typical business hours of the user, work days, as well as a number of other aspects of the user interaction pattern may also be determined and represented in the user interaction heuristics. The scheduler 120 can then use such heuristics when scheduling update-process triggers.

Likewise, the application update frequency module 220 can collect information and generate heuristics on how often a user receives application state updates, such as frequency of emails, instant messages and/or voicemails. The application update frequency heuristics may also comprehend date and time of day. For example, a user may receive significantly more emails, instant messages and voicemails during business hours than during non-business hours, such as weekends. Variations in application update frequency patterns associated with date and time of day may also be reflected in the heuristics. The activity monitor 200 may similarly also collect information and produce heuristics associated with security component updates and operating system updates, such as frequency of updates, dates and times of last updates, as well as a number of other items related to security components and an operating system of the computing device. As was noted above, an update-process trigger scheduler, such as the scheduler 120, may use such heuristics to schedule update-process triggers, for example, in accordance with the techniques described herein.

Figure 3:
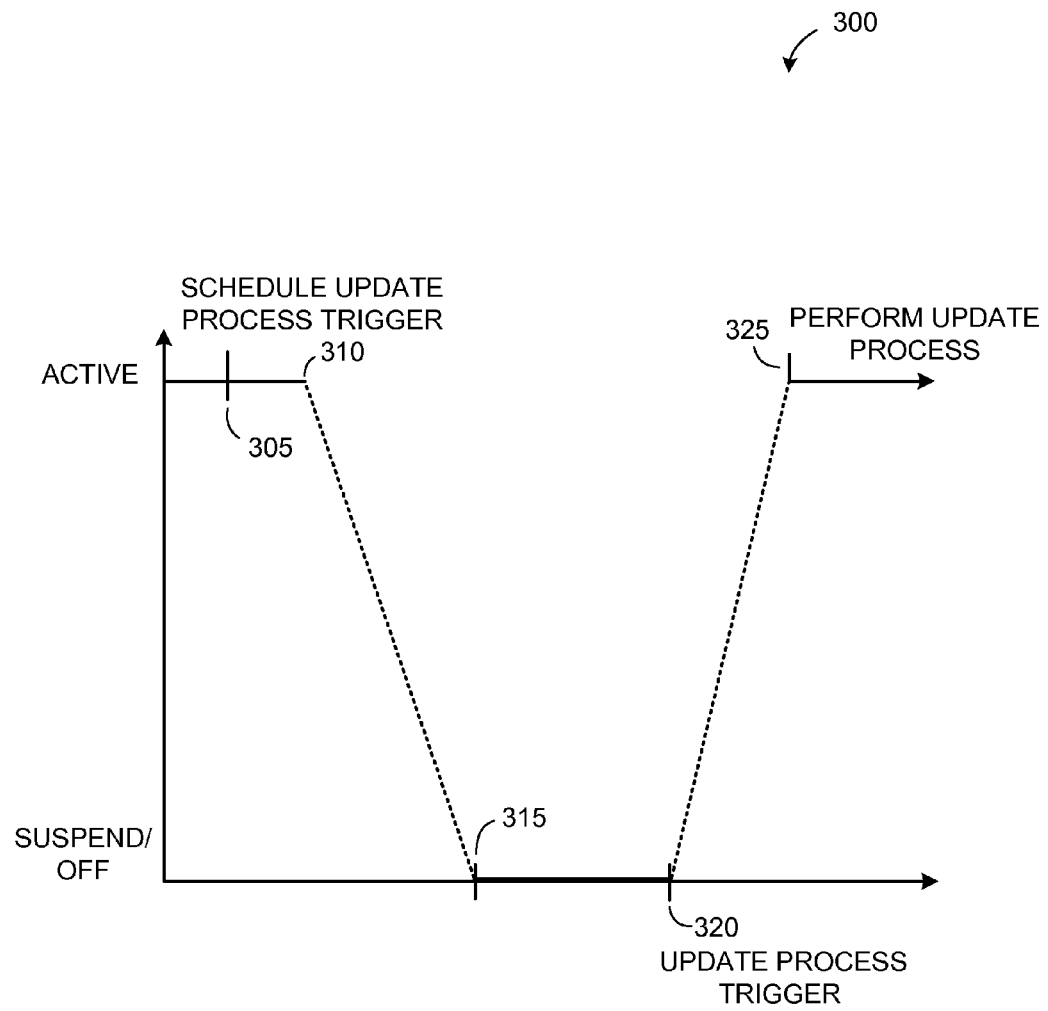
FIG. 3 is a timing diagram illustrating timing of an update process in accordance with an example embodiment.

FIG. 3 is a timing diagram 300 illustrating timing of an update process in accordance with an example embodiment. The timing diagram 300 indicates whether a computing device, over time, is active, suspended or transitioning between power states at various times during a method that implements an update process for the computing device, such as the computing device 100. The timing diagram 300 may correspond, for example, with the method 600 illustrated in FIG. 6, which is discussed in further detail below. In the timing diagram 300, the active operating state indicated on the vertical axis may be any of the active operating states described herein, e.g., display-on or display-off. Also, the suspend/off state indicated on the vertical axis may be any of the suspend states or powered off states described herein. In the timing diagram 300, the horizontal axis indicates time.

As shown in the timing diagram 300, an update-process trigger may be automatically scheduled in a computing device at time 305. The update-process trigger may be scheduled using the techniques described herein. For instance, scheduling the update-process trigger may comprise scheduling an RTC alarm or initializing a timer based on heuristics of the computing device, such as by using one or more decision tree structures. In such approaches, the RTC and/or the timer may be configured to remain active when the computing device is in a suspend state or powered off state, so that the update-process occurs at the scheduled time. After scheduling the update-process trigger, the computing device may be initiate a transition from the active operating state to a suspend or powered-off state at time 310, with that transition being completed at time 315.

As shown in the timing diagram 300, the update-process trigger may occur at time 320, causing the computing device to transition from the suspend/off state to an active power state, which may be the same active power state the computing device was operating in prior to being suspended at time 310, or it may be a different active power state. At time 325, the computing device completes the transition from the suspend/off power state to the active power state and then performs an update process, such as in accordance with the approaches described herein.

Figure 4:
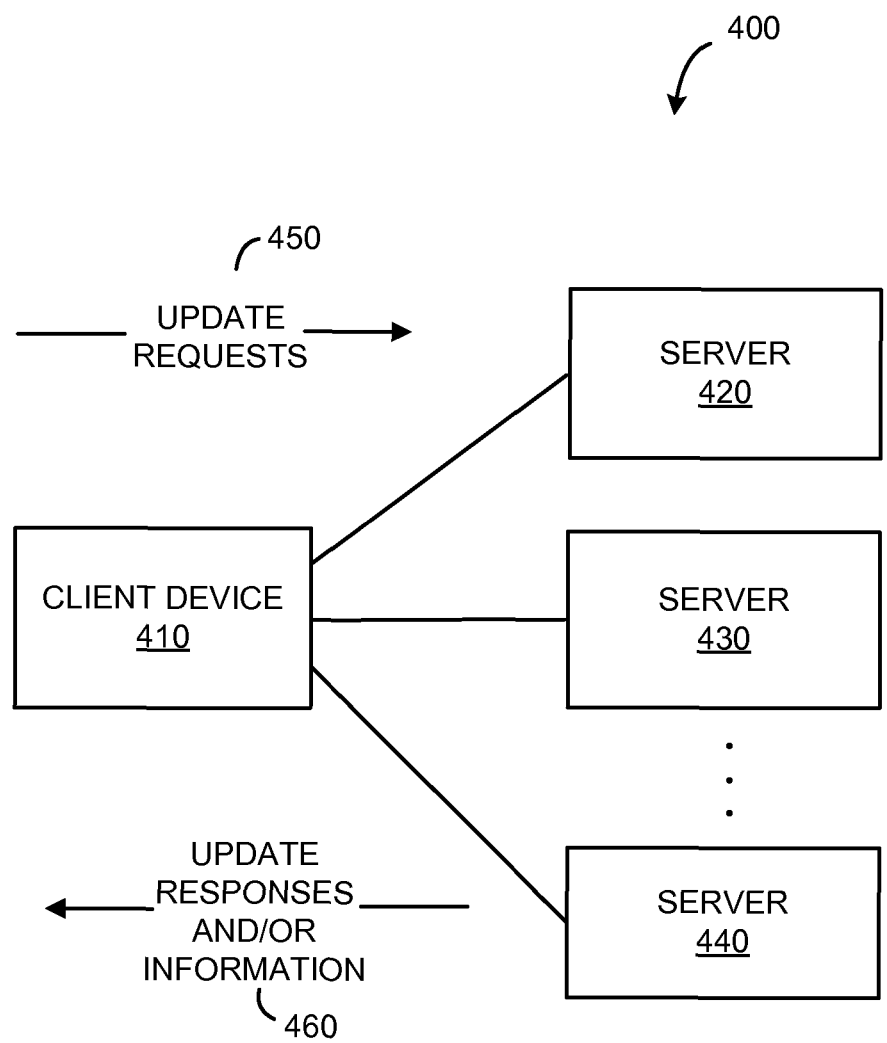
FIG. 4 is a block diagram illustrating a network in accordance with an example embodiment in which techniques for implementing an update process may be implemented.

FIG. 4 is a block diagram illustrating a network 400 in accordance with an example embodiment in which techniques for implementing an update process may be implemented. The network 400 includes a client device 410 (which may take the form of computing device 100) and servers 420, 430 and 440, which may be email servers, instant messaging servers, or servers that store update information for security components, an operating system and/or software of the client device 410. The client device 410 and the servers 420-440 may be operationally coupled via a data network, such as a local area network, or a wide area network, such as the Internet, as two examples. Alternatively, the client device 410 may be operationally coupled with the servers 420-440 via a wireless data network, such as a 3G or 4G wireless data network.

The network 400 may be used to implement the techniques described herein for implementing an update process for the client device 410. For instance, with further reference to FIG. 3, at time 325, the client device 410 may send one or more update requests 450 to one or more of the servers 420-440. In response to that request or requests, the servers 420-440 may provide respective update responses 460. The update responses 460 may include a summary of available update information for the client device 410, such as described below with respect to FIG. 5. The update responses may, alternatively, include available update information that the client device 410 may use to update its operating state, such as by using the techniques described herein.

In some embodiments, the servers 420-440 may provide a summary of available update information to the client device 410 in response to a first request from the client device 410 and then provide requested update information to the client device 410 in response to a second request. In such an approach, the client device 410, in the second request, may request all available update information, or may request only a subset of the available update information, where the update information requested is based on decisions made by the client device 410 using the summary information, such as using the techniques described herein. In other instances, the client device 410 may not send a second request if (e.g., based on the summary information) the client device 410 decides not to perform any updates.

FIGS. 5A and 5B are tables 500 and 550 illustrating summaries of available update information for a computing device in accordance with example embodiments. FIG. 5A illustrates a table 500 that includes a summary of available update information that may be used to update respective operating states of user applications that may be running on a computing device. The table 500 includes three columns, a column indicating the type of available update information, a column indicating a number of items for each type and a column indicating an overall size (e.g., quantity) of the available update information data for each type. The example of table 500 indicates that ten emails are available with the total size of those emails being 1.6 MB. The table 500 further indicates that thirty instant messages are available with a total size of those instant messages being 16 kB, and that 5 voicemails are available with a total size of those voicemails being 2.7 MB. It will be appreciated that the table 500 could be arranged in other fashions. For example, each available item could be listed separately, additional columns (e.g., summary information) could be included, such as time of receipt of each item, or columns could be eliminated, such as the column indicating the number of items of each type, for example.

The table 550 in FIG. 5B includes four columns, which include a column indicating the type of available update information, a column indicating the number of items available for each type, a column indicating a highest priority for the available updates of each type and a column indicating an overall size for the available items of each information type. The priority designations used may vary depending on the particular embodiment. For purposes of this disclosure, priorities for available updates may range from '1' to '5' with '1' being the highest priority and '5' being the lowest priority. The example of table 550 indicates that two security updates are available with a highest priority of '1' and an overall size of 3.4 MB. Such security updates may include virus definition updates, spyware signature updates, firewall updates, or a number of other security related updates, such as browser updates, for example. The example of table 550 further indicates that one operating system update with a priority of '4' and a size of 5.6 MB is available, and that three client software updates are available with a highest priority of '2' and an overall size of 18.7 MB. As with the table 500, the table 550 could be arranged in other fashions, such as individually listing each available item, adding columns to the table 550, removing columns from the table 550 or making a number of other changes to the information included in the table 550.

The information in tables 500 and 550 may be provided from one or more servers and information from multiple servers may be combined to produce such tables. The information included in the tables 500 and 550 (or other such information) may be used by a computing device to implement an update process, such as using the approaches described herein. For example, a computing device may use the information included in the tables 500 and 550 to make decisions as to which, if any updates to perform as part of an update process. Such decisions may be made, for example, using the techniques described herein.

Figure 6A:
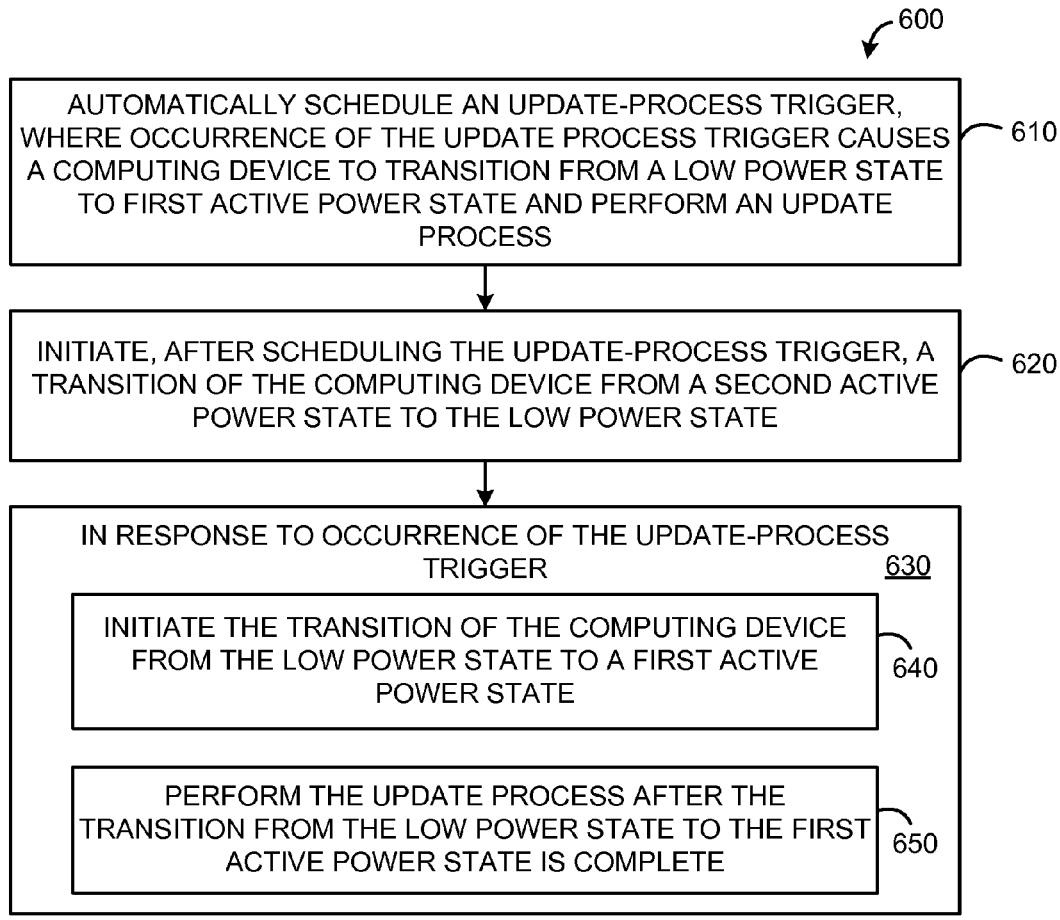
FIGS. 6A and 6B are flowcharts illustrating methods for implementing an update process in accordance with example embodiments.
Figure 6B:
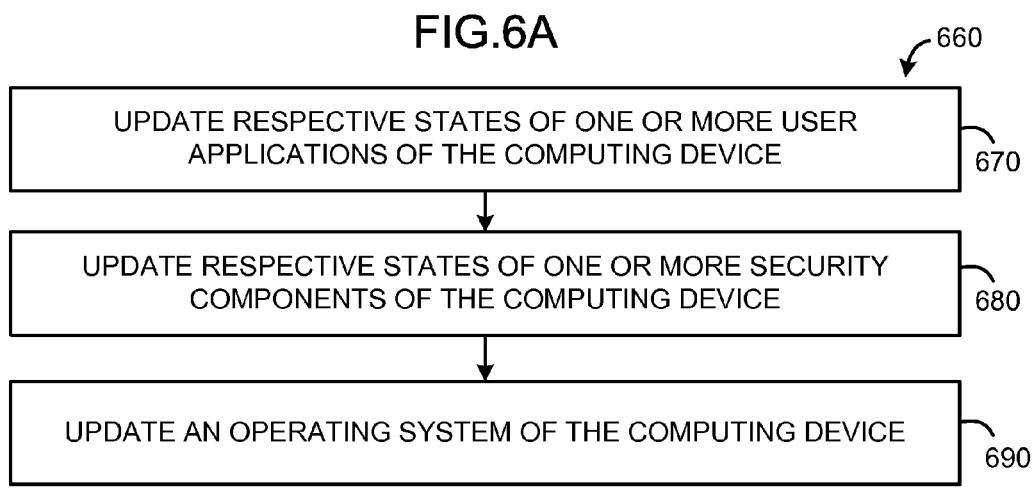

FIGS. 6A and 6B are flowcharts illustrating methods 600 and 660 that may be used to implement an update process in accordance with example embodiments. The methods 600 and 660, as well as the other methods and described herein, may be implemented using the apparatus and techniques described above with respect to FIGS. 1-5 and also may implemented in combination with one another, as appropriate. Of course, the methods described herein may also be implemented in a number of other appropriate apparatus and using appropriate alternative techniques. For purposes of illustration, the descriptions of FIGS. 6-9 will be made with further reference to other drawings of the application.

The method 600 shown in FIG. 6A includes, at block 610, automatically scheduling, such as in the computing device 100, an update-process trigger. Scheduling the update-process trigger at block 610 may include setting an RTC alarm in the RTC 110 or initializing the timer 115, such as was discussed above. In the method 600, occurrence of the update-process trigger may cause the computing device 100 to transition from a low power (e.g., suspended) state to a first active power state (e.g., display-off state or display-on state) and perform an update process for the computing device 100.

The method 600 further includes, at block 620, initiating, after scheduling the update-process trigger, a transition of the computing device from a second active power state (e.g., display-on state or display off state) to the low power state. The method 600 still further includes, at block 630, performing the operations of block 640 and 650 in response to occurrence of the update-process trigger, such as occurrence of the RTC alarm in the RTC 110 or expiration of the timer 115. At block 640, the method 600 includes initiating the transition of the computing device from the low power state to the first active power state. At block 650, the method 600 includes performing the update process after the transition from the low power state to the first active power state is complete. The update process at block 650 may be performed in a number of fashions, such as using the techniques described herein.

FIG. 6B is a flowchart that illustrates a method 660 for performing an update process in accordance with an example embodiment. The method 660 may be implemented in conjunction with the method 600 using, for example, the techniques described herein. The method 660 includes, at block 670, updating respective states of one or more user applications of the computing device. In an example embodiment, a computing device, such as the computing device 100, may update the respective states by sending a request or requests to one or more servers for update information for the user applications. The computing device 100 may then receive update information for the one or more applications from the server or servers. For instance, the update information may include emails, voicemails and/or instant messages for a user of the computing device 100, where those emails, voicemails and/or instant messages have been received since the computing device 100 was suspended (e.g., at block 620). The computing device 100 may then use the received update information to update the respective state or states of the one more user applications.

The method 660 also includes, at block 680, updating respective states of one or more security components of the computing device. This may include requesting available update information from one or more servers, receiving, in response to the request or requests, updates for anti-virus software, spyware removal software and/or a firewall of the computing device 100, as some examples, and updating the one or more security components using the received update information. The method 660 further includes, at block 690, updating an operating system of the computing device. In like fashion as the operations at blocks 670 and 680, updating the operating system of the computing device at block 690 may include requesting available update information from one or more servers, receiving, in response to the request or requests, available updates for an operating system of the computing device and updating the operating system using the received update information.

In some embodiments, performing an update process may include fewer operations. For example, an update process may include one or more of the operations of blocks 670, 680 and 690. In other embodiments, performing an update process may include additional operations. For instance, a computing device may first receive a summary or summaries of available update information (e.g., such as illustrated in FIGS. 5A and 5B), and make respective decisions on which, if any, of the available updates to perform (e.g., such as using a decision tree as discussed further below with respect to FIG. 9). Once the computing device has determined which updates to perform, the computing device may then request the update information for those updates from the respective servers, receive the requested update information in response to the request or requests and update an operating state of the computing device using the received update information. One example alternative approach for implementing an update process is further described below with respect to FIGS. 7A and 7B.

Figure 7A:
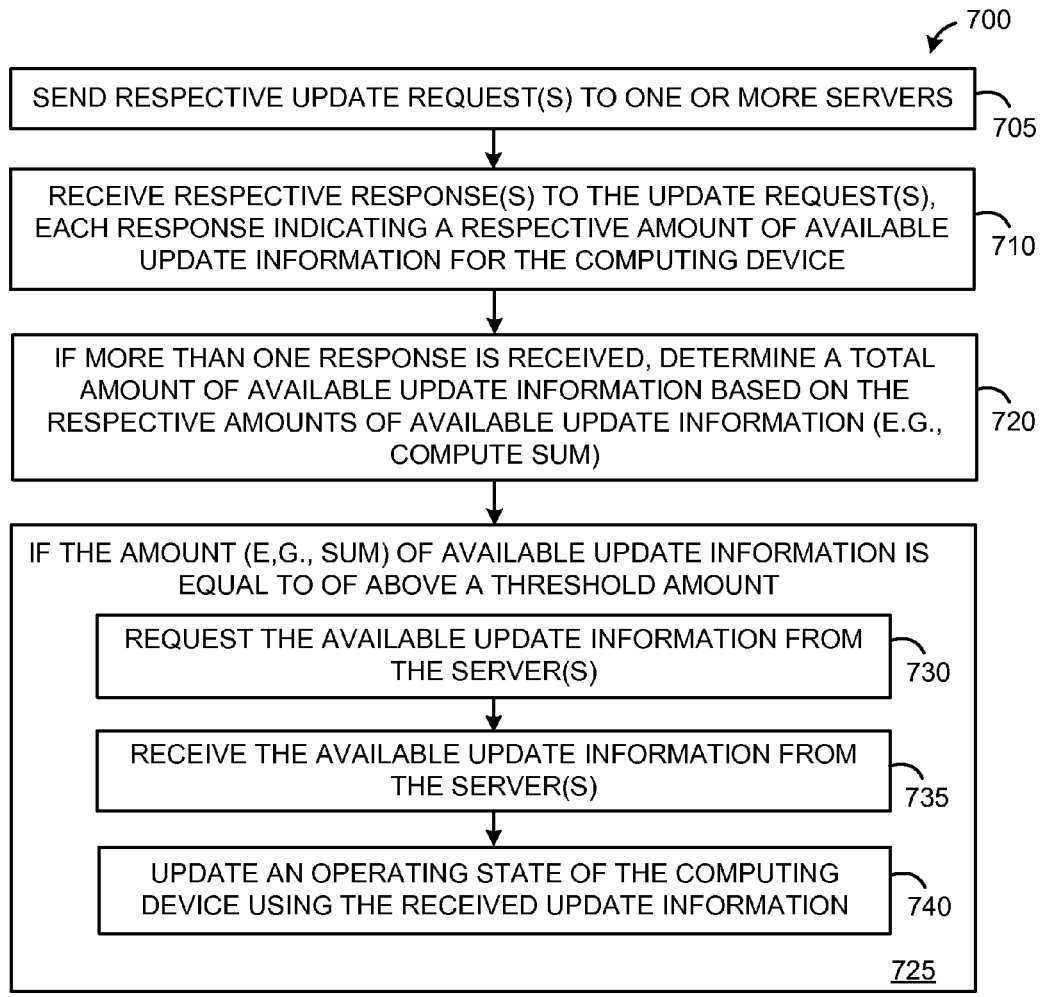
FIGS. 7A and 7B are flowcharts illustrating methods for implementing an update process in accordance with example embodiments.
Figure 7B:
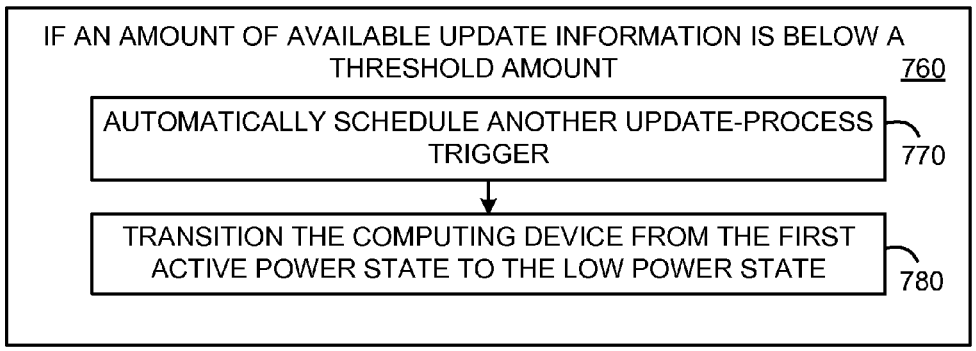

FIGS. 7A and 7B are flowcharts illustrating methods 700 and 750 for implementing an update process in accordance with an example embodiment. The method 700 includes, at block 705, sending one or more respective update requests to one or more servers. The method 700 also includes, at block 710, receiving one or more respective responses to the one or more update requests. At block 710, the one or more responses may include respective indications of respective amounts (quantities) of update information data that are available for the computing device. For instance, the computing device may receive a summary or summaries of available update information, such as those illustrated in FIGS. 5A and 5B.

At block 720, if more than one response to the update request or requests is received, the method 700 may include determining a total quantity of available update information data. For example, the determination at block 720 may include calculating a sum of the sizes (e.g., in bytes) of available updates.

The method 700 further includes, at block 725, performing the operations of blocks 730, 735 and 740 if the amount or quantity (e.g., the total amount determined at block 720) of available update information data is above a threshold amount. In other approaches, more than one threshold amount could be used and separate decisions could made whether or not to perform individual updates, where those decisions are based on a comparison of a size (or other attribute) of each update with a respective threshold.

At block 730, the method 700 includes requesting the available update information from the respective server or servers on which it is available. At block 735, the method 700 includes receiving the available update information from the server or servers. At block 740, the method 700 includes updating an operating state of the computing device using the received update information. As described herein, updating the operating state of the computing device may include updating one or more user applications, updating one or more security components and/or updating an operating system of the computing device. Of course, other updates may be performed as part of an update process, such as performing a firmware update and/or updating device drivers for the computing device.

The method 750 illustrated in FIG. 7B may be implemented in conjunction with the method 700 of FIG. 7A. The method 750 includes, at block 760, performing the operations of block 770 and 780 if a quantity of available update information data is below a threshold amount and, based on that comparison, the computing device determines not to perform the available updates. In other approaches, a computing device may perform the operations of blocks 770 and 780 after determining, on an individual basis, that each of plurality of updates will not be performed. These individual determinations may be based on, for example, individual comparisons of one or more respective attributes of each available update with respective thresholds. At block 770, the method 700 includes automatically scheduling another update-process trigger. Scheduling the update-process trigger at block 770 may be done using the techniques described herein, such as by using a decision tree such as described below with respect to FIG. 9. At block 780, the method 700 includes transitioning the computing device from the first active power state (e.g., of block 640 of the method 600) to a low power (e.g., suspend) state.

Figure 8:
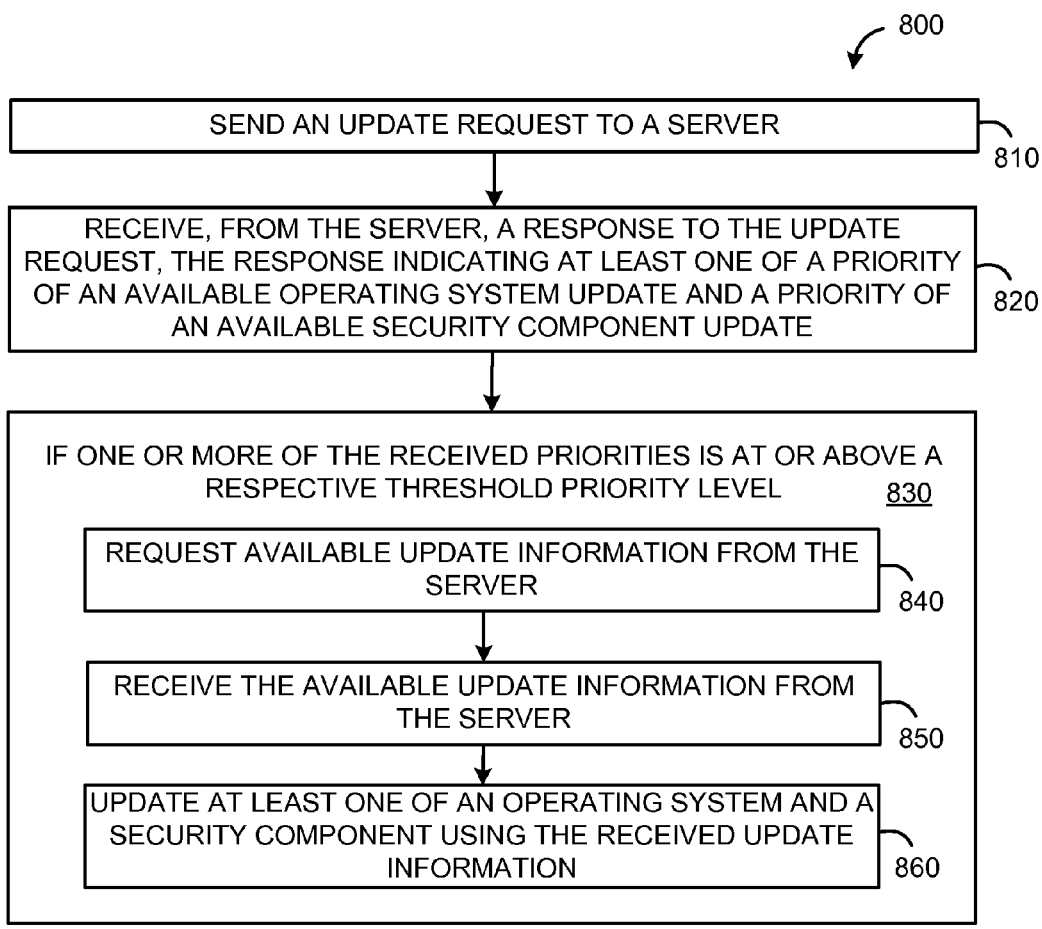
FIG. 8 is a flowchart illustrating a method for implementing an update process in accordance with an example embodiment.

FIG. 8 is a flowchart illustrating a method 800 for implementing an update process in accordance with an example embodiment. The method 800 includes, at block 810 sending an update request (e.g., from a computing device) to a server. At block 820, the method 800 includes receiving, from the server, a response to the update request that indicates at least one of a priority of an available operating system update for the computing device and a priority of an available security component update for the computing device.

The method 800 further includes, at block 830, performing the operations of block 840, 850 and 860 if at least one of the received priorities is at or above a respective threshold priority level. As an example, if update priorities are indicated with priority levels '1' to '5', with '5' being the lowest priority and '1' being the highest, the operations at block 830 may only be performed for updates that have priorities of '3' or above. In other embodiments, determinations of whether to implement a particular type of update (e.g., security component or operating system) could be made using different priority thresholds. For instance, decisions regarding security component updates could use a priority threshold of '4', while decisions regarding operating system updates could use a priority threshold of '2'.

At block 840, the method 800 includes requesting available update information from the server (e.g., for updates that the computing system has decided to implement). At block 850, the method 800 further includes receiving the requested available update information from the server. At block 860, the method 800 includes updating at least one of an operating system of the computing device and at least one security component of the computing device using the received update information. The updates at block 860 may be made accordance with decisions made based on the comparisons (at block 830) of the priorities received at block 820 with the priority threshold levels.

Figure 9:
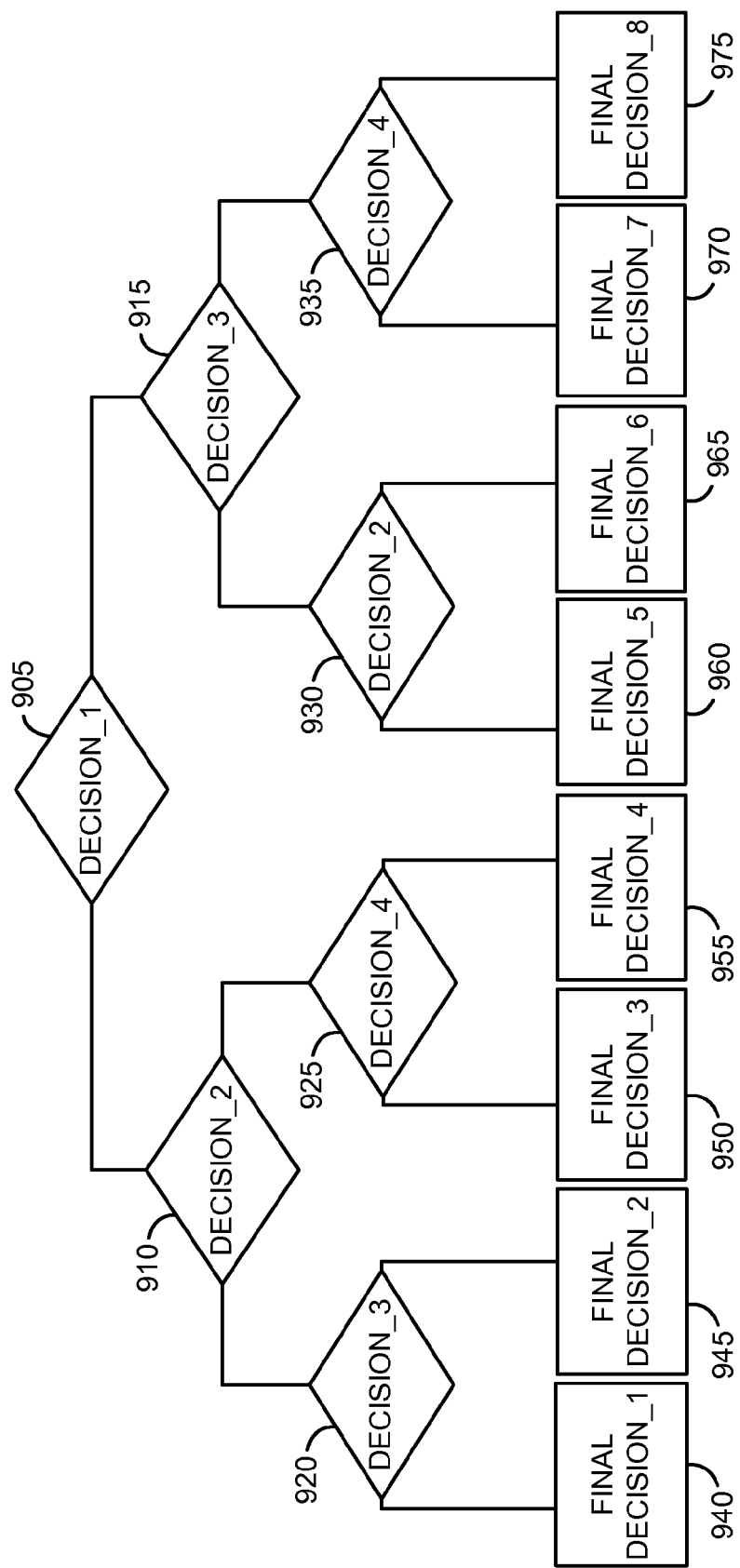
FIG. 9 is a diagram illustrating a decision tree that may be used to implement an update process in accordance with an example embodiment.

FIG. 9 is a diagram illustrating an example of a decision tree 900 that may be used to implement an update process in accordance with an example embodiment. The decision tree 900 is provided by way of example and for purposes of illustration. The exact structure of the decision tree 900 may vary based on the particular embodiment and may be extremely complex. For instance, the decision tree 900 may include hundreds or thousands of decision blocks and a large number of corresponding final decision blocks. In some embodiments, the decision tree 900 may be used to implement the methods described herein. For instance, the decision tree 900 may be used to schedule an update-process trigger. The decision tree 900 may also be used when implementing an update process, such as in the methods illustrated in FIGS. 6B, 7A, 7B and 8, to make decisions as to which, if any available updates to perform.

As shown in FIG. 9, the decision tree 900 includes decision blocks 905-935 and final decision blocks 940-975. The decisions made at each of these blocks will depend on the particular embodiment. For instance, if the decision tree 900 is used to schedule an update-process trigger, the decisions at each of the decision blocks 905-935 may be based on heuristics of a computing device (e.g., such as gathered by the activity monitor 200) and the final decisions 940-975 may be used to schedule update-process triggers based on the heuristic based decisions made at blocks 905-935.

For example, the decision tree 900 may be traversed to schedule an update-process trigger and the decisions of blocks 905-935 may each be based, for example, on at least one of a history of user interaction with the computing device, an application update frequency for the computing device, a time of a last security update of the computing device, a time of a last operating system update of the computing device, a calendar date of the computing device; and a time of day of the computing device. As may be seen from blocks 910 and 930, and from blocks 915 and 920, individual decisions may be included in multiple branches of the decision tree 900. While each decision block 905-935 is shown with only two outputs, in other embodiments, additional decision paths could be included. In addition, the blocks of the decision tree 900 could have multiple input paths.

As an example of using the decision tree 900, a computing device may be configured to perform a security update at least once every day. In this instance, the decision tree 900 may include decisions at block 905-935 to schedule an update-process trigger to ensure timely performance of that update. For instance, the decision tree 900 may implement decisions based on a date and time of a last security update and schedule an update-process trigger so that the computing device performs a security component update within 24 hours of the date and time of the last update. The decision tree 900 could implement decisions in the blocks 905-935 that, when traversed, lead to a final decision that indicates a date and time at which the update-process trigger should be scheduled that is with 24 hours of the last update.

In another example, a computing device may be configured to perform an update process just prior to a time when it is anticipated that a user of the computing device will return. For example, the computing device may monitor user interaction with the computing device (e.g., using the activity monitor 200). The computing device may generate heuristics based on that monitoring. Those heuristics may indicate that the user, during business hours, typically interacts with the computing device within an hour after a period of inactivity begins. In such a situation, the decision tree 900 may implement decisions at blocks 905-935 that, when traversed, results in an update-process trigger being scheduled fifty minutes after the beginning of a period of inactivity during normal business hours. In some embodiments, parameters for what constitutes business hours may be configured by the user or determined by the computing device based on date, time and user interaction patterns. Such approaches may improve the user's experience as updates to operating state of the computing are performed in anticipation of the user's return and without the need for the user to interact with the computing device. Such an approach may give the user the impression that the computing device remained on during the period of user inactivity, as the computing device state has been recently updated.

In some embodiments, multiple decision trees 900 could be used to schedule an update-process trigger, where each individual decision tree 900 is based on a limited set of heuristics. In such an approach, each individual decision tree 900 could result in a proposed time for scheduling an update-process trigger, with the multiple decision trees 900 generating a set of proposed update-process trigger times. The computing device (e.g., using an update-process trigger scheduler 120) could then, for example, select an earliest proposed time from the set of proposed times and schedule the update-process trigger at the selected time. In other embodiments, other approaches for selecting one of the proposed times may be used.

The decision tree 900 could also be used as part of an update process to implement decisions as to which updates to perform from available updates, such as in the methods 700, 750 and 800. In such an approach, the decision tree 900 may be used to implement decisions based on the size of available updates and/or priorities of available updates and corresponding size and/or priority thresholds. In other embodiments, other criteria may be used. In similar fashion as with scheduling an update-process trigger, an update process may be implemented using a single decision tree, or may be implemented using multiple decision trees. For example, respective individual decision trees 900 may be implemented to make decisions as whether or not to implement an updates for each individual update or each type of update.

Figure 10:
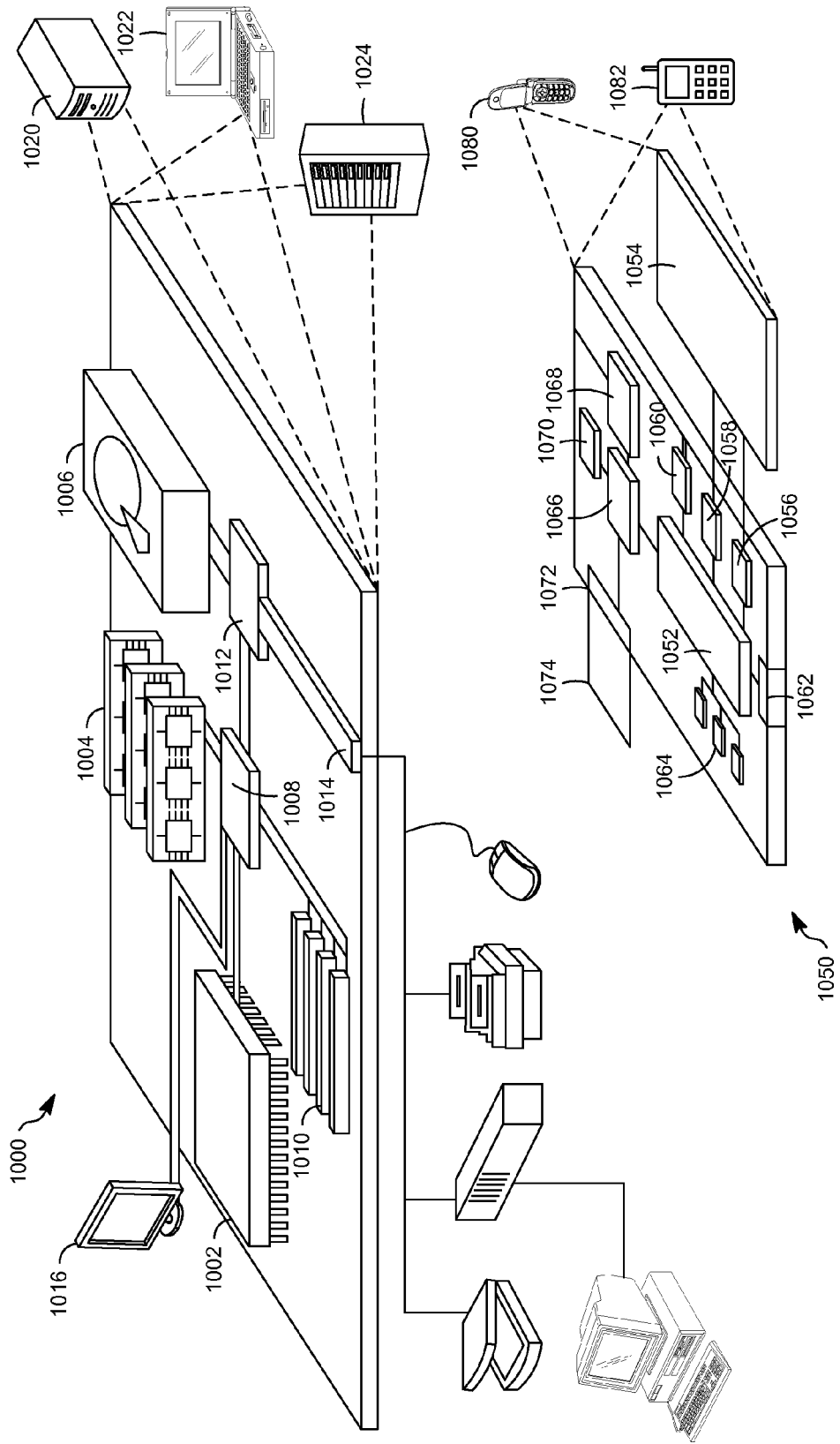
FIG. 10 is a diagram that illustrates a computing device and a mobile computing device that can be used to implement the techniques described herein in accordance with an example embodiment.

FIG. 10 is a diagram that shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1084 may also be provided and connected to device 1050 through expansion interface 1082, which may include, for example, a SIMM (Single In Line Memory Module) card interface. Such expansion memory 1084 may provide extra storage space for device 1050, or may also store applications or other information for device 1050. Specifically, expansion memory 1084 may include instructions to carry out or supplement the processes described above, and may include secure information also. Thus, for example, expansion memory 1084 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1084, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1080 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   automatically scheduling, in a computing device, an update-process trigger, wherein occurrence of the update-process trigger causes the computing device to:
   transition from a low power state to a first active power state; and
   perform an update process for the computing device;
   initiating, after scheduling the update-process trigger, a transition of the computing device from a second active power state to the low power state; and
   in response to occurrence of the update-process trigger:
   initiating the transition of the computing device from the low power state to the first active power state; and
   performing the update process after the transition from the low power state to the first active power state is complete, the update process comprising:
   sending, from the computing device to a server, a first update request;
   receiving, from the server, a response to the first update request, the response including a summary of available update information for a plurality of types of update information for the computing device, the plurality of types of update information being associated with a plurality of attributes;
   selecting one of the plurality of attributes;
   determining, by the computing device and for each of the plurality of types of update information, if a value for the selected attribute meets or exceeds a predetermined threshold value for the selected attribute for the type of update information; and
   based on determining that the value for the selected attribute for the type of update information meets or exceeds the threshold value:
   sending, from the computing device to the server, a second update request requesting the available update information for the type of update information from the server;
   receiving the available update information from the server in response to the second update request; and
   updating an operating state of the computing device using the received update information.

2. The computer-implemented method of claim 1, wherein scheduling the update-process trigger comprises scheduling a real-time-clock alarm wherein occurrence of the alarm indicates occurrence of the update-process trigger.

3. The computer-implemented method of claim 1, wherein scheduling the update-process trigger comprises initializing a timer, wherein the timer is configured such that expiration of the timer indicates occurrence of the update-process trigger.

4. The computer-implemented method of claim 1, wherein the low power state comprises one of a suspend-to-RAM power state, a suspend-to-disk power state and a powered-off power state.

5. The computer-implemented method of claim 1, wherein the first active power state comprises a display-off active power state and the second active power state comprises a display-on active power state.

6. The computer-implemented method of claim 1, wherein the first active power state and the second active power state are substantially equivalent active power states.

7. The computer-implemented method of claim 1, wherein updating an operating state of the computing device comprises at least one of:
   updating respective states of one or more user applications of the computing device;

updating respective states of one or more security components of the computing device; and
updating an operating system of the computing device.

8. The computer-implemented method of claim 1, wherein the received update information includes at least one of:
respective update information for one or more user applications of the computing device;
respective update information for one or more security components of the computing device; and
update information for an operating system of the computing device.

9. The computer-implemented method of claim 8, wherein the respective update information for the one or more user applications of the computing device includes at least one of:
one or more email messages;
one or more voicemail messages; and
one or more instant messages.

10. The computer-implemented method of claim 8, wherein the respective update information for the one or more security components of the computing device includes at least one of:
virus definition updates; and
spyware signature updates.

11. The computer-implemented method of claim 1, wherein, based on determining that the value for the selected attribute for the type of update information is below the threshold value, the update process further comprises:
automatically scheduling another update-process trigger without sending, from the computing device to the server, the second update request; and
transitioning the computing device from the first active power state to the low power state.

12. The computer-implemented method of claim 1, wherein selecting one of the plurality of attributes comprises selecting a priority attribute, and wherein the summary of available update information received from the server includes at least one of:
a value for a priority attribute associated an operating system type of update information for the computing device, the value indicative of a priority of an available operating system update for the computing device; and
a value for a priority attribute associated a security component type of update information for the computing device, the value indicative of a priority of an available security component update for the computing device; and
if at least one of the received priority values meets or exceeds a respective threshold priority value:
sending, from the computing device to the server, a second update request requesting available update information for the type of update information from the server comprises sending an update request requesting the available update information for each of the updates whose associated priority value meets or exceeds the respective threshold priority value; and
updating an operating state of the computing device using the received update information comprises updating at least one of an operating system of the computing device and a security component of the computing device.

13. The computer-implemented method of claim 1,
wherein sending, from the computing device to a server, a first update request comprises sending, from the computing device to a plurality of servers, respective update requests;
wherein receiving, from the server, a response to the first update request, comprises receiving, from the plurality of servers, respective responses to the update requests, each response including respective summaries of available update information for a plurality of types of update information for the computing device, the plurality of types of update information being associated with a plurality of attributes;
wherein the method further comprises determining, by the computing device and for each of the plurality of types of update information, a total value for the selected attribute based on the respective values for the selected attribute;
wherein determining, by the computing device and for each of the plurality of types of update information, if a value for the selected attribute meets or exceeds a predetermined threshold value for the selected attribute for the type of update information comprises determining that the total value for the selected attribute meets or exceeds a predetermined threshold value for the selected attribute for the type of update information;
wherein sending, from the computing device to the server, a second update request comprises requesting the available update information from the plurality of servers; and
wherein receiving the available update information from the server comprises receiving the available update information from the plurality of servers.

14. The computer-implemented method of claim 1, wherein scheduling the update-process trigger comprises traversing, by the computing device, a decision tree, wherein the computing device traverses the decision tree based on at least one of:
the history of user interaction with the computing device;
the application update frequency for the computing device;
the time of a last security update of the computing device;
the time of a last operating system update of the computing device;
the calendar data of the computing device; and
the time of day of the computing device.

15. The computer-implemented method of claim 1, wherein the summary of available update information includes at least one of:
an indication of available user application update information for the computing device;
an indication of available security component update information for the computing device; and
an indication of available operating system update information for the computing device;
and the method further comprises:
traversing, by the computing device based on the indications included in the summary of available update information, a decision tree; and
based on the traversing, determining:
whether to update a respective state of one or more applications of the computing device;
whether to update a respective state of one or more security components of the computing device; and
whether to update an operating system of the computing device.

16. A computer-implemented method comprising:
automatically scheduling, in a computing device, an update-process trigger, wherein occurrence of the update-process trigger causes the computing device to:
transition from a low power state to a first active power state; and
perform an update process for the computing device;

initiating, after scheduling the update-process trigger, a transition of the computing device from a second active power state to the low power state; and in response to occurrence of the update-process trigger:
  initiating the transition of the computing device from the low power state to the first active power state; and
  performing the update process after the transition from the low power state to the first active power state is complete, the update process comprising:
    sending, from the computing device to a plurality of servers, respective update requests;
    receiving, from the plurality of servers, respective responses to the update requests, each response including respective summaries of available update information for a plurality of types of update information for the computing device;
    determining, by the computing device and for each of the plurality of types of update information, a total value for an attribute based on respective values for the attribute, the attribute included in a plurality of attributes associated with a type of update information included in a plurality of types of update information for the computing device;
    determining that the total value of the attribute meets or exceeds a threshold value for the attribute; and
    based on determining that the total value of the attribute meets or exceeds the threshold value:
    requesting the available update information from the plurality of servers;
    receiving the available update information from the plurality of servers; and
    updating an operating state of the computing device using the received update information.

17. The computer-implemented method of claim 16, wherein the update process further comprises at least one of:
  updating respective states of one or more user applications of the computing device;
  updating respective states of one or more security components of the computing device; and
  updating an operating system of the computing device.

18. The computer-implemented method of claim 16, wherein
  sending, from the computing device to a plurality of servers, respective update requests includes sending a first update request;
  wherein receiving from the plurality of servers respective responses to the update requests includes receiving respective responses to the first update request, each respective response including a summary of available update information for the plurality of types of update information for the computing device; and
  wherein requesting the available update information from the plurality of servers includes sending, from the computing device to the plurality of servers, respective update requests including a second update request requesting the available update information for the type of update information from the server.

19. The computer-implemented method of claim 16, wherein the received update information includes at least one of:
  respective update information for one or more user applications of the computing device;
  respective update information for one or more security components of the computing device; and
  update information for an operating system of the computing device.

20. The computer-implemented method of claim 19, wherein the respective update information for the one or more user applications of the computing device includes at least one of:
  one or more email messages;
  one or more voicemail messages; and
  one or more instant messages.

21. The computer-implemented method of claim 19, wherein the respective update information for the one or more security components of the computing device includes at least one of:
  virus definition updates; and
  spyware signature updates.

22. The computer-implemented method of claim 16, wherein, based on determining that the total value of the attribute is below the threshold value for the attribute, the update process further comprises:
  automatically scheduling another update-process trigger without requesting the available update information from the plurality of servers; and
  transitioning the computing device from the first active power state to the low power state.

23. A computer-implemented method comprising:
automatically scheduling, in a computing device, an update-process trigger, wherein occurrence of the update-process trigger causes the computing device to:
  transition from a low power state to a first active power state; and
  perform an update process for the computing device;
initiating, after scheduling the update-process trigger, a transition of the computing device from a second active power state to the low power state; and
in response to occurrence of the update-process trigger:
  initiating the transition of the computing device from the low power state to the first active power state; and
  performing the update process after the transition from the low power state to the first active power state is complete, the update process comprising:
    sending, from the computing device to a server, an first update request;
    receiving, from the server, a response to the first update request, the response including a summary of available update information for a plurality of types of update information for the computing device, wherein the summary of available update information includes:
      a value for a priority attribute associated an operating system type of update information for the computing device, the value indicative of a priority of an available operating system update for the computing device; and
      a value for a priority attribute associated a security component type of update information for the computing device, the value indicative of a priority of an available security component update for the computing device; and
    if at least one of the received priority values meets or exceeds a respective threshold priority value:
      sending, from the computing device to the server, a second update request requesting the available update information from the server for each of the updates whose associated priority value meets or exceeds the respective threshold priority value;
      receiving the available update information from the server; and updating at least one of an operating system of the computing device and a security component of the computing device using the received update information.

24. The computer-implemented method of claim 23, wherein the summary of available update information further includes a value for a priority attribute associated with a user application type of update information for the computing device, the value indicative of a priority of an available user application update for the computing device, and wherein updating further includes updating at least one of an operating system of the computing device, a security component, and a user application of the computing device of the computing device using the received update information.

25. The computer-implemented method of claim 23, wherein if all of the received priority values are below a respective threshold priority value:

automatically scheduling another update-process trigger requesting a summary of available update information from the server; and transitioning the computing device from the first active power state to the low power state.

26. A non-transitory recordable storage medium having recorded and stored thereon instructions that, when executed by a computing device, cause the computing device to:

automatically schedule, in the computing device, an update-process trigger, wherein occurrence of the update-process trigger causes the computing device to:
  transition from a low power state to a first active power state; and
  perform an update process for the computing device;

initiate, after scheduling the update-process trigger, a transition of the computing device from a second active power state to the low power state; and in response to occurrence of the update-process trigger:
  initiate the transition of the computing device from the low power state to the first active power state; and
  perform the update process after the transition from the low power state to the first active power state is complete, the update process comprising:
    sending, from the computing device to a server, a first update request;
    receiving, from the server, a response to the first update request, the response including a summary of available update information for a plurality of types of update information for the computing device, the plurality of types of update information being associated with a plurality of attributes;
    selecting one of the plurality of attributes;
    determining, by the computing device and for each of the plurality of types of update information, if a value for the selected attribute meets or exceeds a predetermined threshold value for the selected attribute for the type of update information; and
    based on determining that the value for the selected attribute for the type of update information meets or exceeds the threshold value:
      sending, from the computing device to the server, a second update request requesting the available update information for the type of update information from the server;
      receiving the available update information from the server in response to the second update request; and
      updating an operating state of the computing device using the received update information.

* * * * *